United States Patent

Bushey et al.

(10) Patent No.: US 7,751,551 B2
(45) Date of Patent: Jul. 6, 2010

(54) SYSTEM AND METHOD FOR SPEECH-ENABLED CALL ROUTING

(75) Inventors: Robert R. Bushey, Cedar Park, TX (US); Benjamin Anthony Knott, Round Rock, TX (US); Sarah Korth, Chicago, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1196 days.

(21) Appl. No.: 11/032,495

(22) Filed: Jan. 10, 2005

(65) Prior Publication Data

US 2006/0153345 A1 Jul. 13, 2006

(51) Int. Cl.
*H04M 3/00* (2006.01)

(52) U.S. Cl. .............. 379/265.02; 379/88.22; 704/257; 704/275

(58) Field of Classification Search ............ 379/265.02, 379/88.01, 265, 265.07, 1.02, 67.1, 88.12, 379/88.22; 704/231, 251, 255, 257
See application file for complete search history.

(56) References Cited

U.S. PATENT DOCUMENTS

| | | | |
|---|---|---|---|
| 4,696,028 A | 9/1987 | Morganstein et al. |
| 4,788,715 A | 11/1988 | Lee |
| 4,953,204 A | 8/1990 | Cuschleg, Jr. et al. |
| 4,964,077 A | 10/1990 | Eisen et al. |
| 4,967,405 A | 10/1990 | Upp et al. |
| 4,975,841 A | 12/1990 | Kehnemuyi et al. |
| 5,042,006 A | 8/1991 | Flohrer |
| 5,235,679 A | 8/1993 | Yoshizawa et al. |
| 5,297,183 A | 3/1994 | Bareis et al. |
| 5,299,260 A | 3/1994 | Shaio |
| 5,335,269 A | 8/1994 | Steinlicht |
| 5,416,830 A | 5/1995 | MacMillan, Jr. et al. |
| 5,432,845 A | 7/1995 | Burd et al. |
| 5,455,903 A | 10/1995 | Jolissaint et al. |
| 5,497,373 A | 3/1996 | Hulen et al. |
| 5,522,046 A | 5/1996 | McMillen et al. |
| 5,530,744 A | 6/1996 | Charalambous et al. |
| 5,555,299 A | 9/1996 | Maloney et al. |
| 5,590,186 A | 12/1996 | Liao et al. |
| 5,621,789 A | 4/1997 | McCalmont et al. |

(Continued)

FOREIGN PATENT DOCUMENTS

EP 0 424 015 A2 4/1991

(Continued)

OTHER PUBLICATIONS

U.S. Appl. No. 10/898,722, filed Jul. 23, 2004.

(Continued)

*Primary Examiner*—Fan Tsang
*Assistant Examiner*—Isabel Kadoorie
(74) *Attorney, Agent, or Firm*—Toler Law Group

(57) ABSTRACT

A method of processing a call is disclosed. The method can transform speech input from a caller of a call into text and convert the text into an object and an action. The method determines a call destination based on the object and the action. The method can route the call to a destination when a caller is not in compliance with at least one business rule. The method can further route the call to the call destination when the caller is in compliance.

12 Claims, 3 Drawing Sheets

U.S. PATENT DOCUMENTS

| | | | |
|---|---|---|---|
| 5,632,002 A | 5/1997 | Hashimoto et al. |
| 5,652,789 A | 7/1997 | Miner |
| 5,659,599 A * | 8/1997 | Arumainayagam et al. | 379/67.1 |
| 5,729,600 A | 3/1998 | Blaha et al. |
| 5,732,133 A | 3/1998 | Mark |
| 5,754,639 A | 5/1998 | Flockhart et al. |
| 5,754,978 A | 5/1998 | Perez-Mendez et al. |
| 5,867,817 A | 2/1999 | Catallo et al. |
| 5,923,745 A | 7/1999 | Hurd |
| 5,930,337 A * | 7/1999 | Mohler | 379/88.22 |
| 5,937,051 A | 8/1999 | Hurd et al. |
| 5,940,476 A | 8/1999 | Morganstein et al. |
| 5,946,377 A | 8/1999 | Wolf |
| 5,946,388 A | 8/1999 | Walker et al. |
| 5,953,704 A | 9/1999 | McIlroy et al. |
| 5,987,116 A | 11/1999 | Petrunka et al. |
| 5,991,756 A | 11/1999 | Wu |
| 5,995,979 A | 11/1999 | Cochran |
| 5,999,965 A | 12/1999 | Kelly |
| 6,002,689 A | 12/1999 | Christie et al. |
| 6,002,760 A | 12/1999 | Gisby |
| 6,003,011 A | 12/1999 | Sarin et al. |
| 6,038,293 A | 3/2000 | McNerney et al. |
| 6,038,305 A | 3/2000 | McAllister et al. |
| 6,044,146 A | 3/2000 | Gisby et al. |
| 6,049,594 A | 4/2000 | Furman et al. |
| 6,061,433 A | 5/2000 | Polcyn et al. |
| 6,064,731 A | 5/2000 | Flockhart et al. |
| 6,118,866 A | 9/2000 | Shtivelman |
| 6,119,101 A | 9/2000 | Peckover |
| 6,144,938 A | 11/2000 | Surace et al. |
| RE37,001 E | 12/2000 | Morganstein et al. |
| 6,173,266 B1 | 1/2001 | Marx et al. |
| 6,173,289 B1 | 1/2001 | Sonderegger et al. |
| 6,173,399 B1 | 1/2001 | Gilbrech |
| 6,175,621 B1 | 1/2001 | Begeja |
| 6,259,786 B1 | 7/2001 | Gisby |
| 6,269,153 B1 | 7/2001 | Carpenter et al. |
| 6,269,336 B1 | 7/2001 | Ladd et al. |
| 6,317,439 B1 | 11/2001 | Cardona et al. |
| 6,320,951 B1 | 11/2001 | Shtivelman et al. |
| 6,333,980 B1 | 12/2001 | Hollatz et al. |
| 6,353,608 B1 | 3/2002 | Cullers et al. |
| 6,366,658 B1 | 4/2002 | Bjornberg et al. |
| 6,366,668 B1 | 4/2002 | Borst et al. |
| 6,377,662 B1 | 4/2002 | Hunt et al. |
| 6,381,329 B1 | 4/2002 | Uppaluru et al. |
| 6,385,584 B1 | 5/2002 | McAllister et al. |
| 6,389,400 B1 | 5/2002 | Bushey et al. |
| 6,400,804 B1 | 6/2002 | Bilder |
| 6,400,996 B1 | 6/2002 | Hoffberg et al. |
| 6,405,159 B2 | 6/2002 | Bushey et al. |
| 6,411,687 B1 | 6/2002 | Bohacek et al. |
| 6,414,966 B1 | 7/2002 | Kulkarni et al. |
| 6,418,424 B1 | 7/2002 | Hoffberg et al. |
| 6,421,433 B1 | 7/2002 | Arsenault |
| 6,434,546 B1 | 8/2002 | Williamowski et al. |
| 6,438,520 B1 | 8/2002 | Curt |
| 6,442,247 B1 | 8/2002 | Garcia |
| 6,483,899 B2 | 11/2002 | Agraharam et al. |
| 6,496,836 B1 * | 12/2002 | Ronchi et al. | 707/104.1 |
| 6,510,414 B1 | 1/2003 | Chaves |
| 6,519,562 B1 | 2/2003 | Phillips et al. |
| 6,526,126 B1 | 2/2003 | Morganstein |
| 6,529,871 B1 | 3/2003 | Kanevsky et al. |
| 6,546,087 B2 | 4/2003 | Shaffer et al. |
| 6,553,112 B2 | 4/2003 | Dhir et al. |
| 6,553,113 B1 | 4/2003 | Dhir et al. |
| 6,570,967 B2 | 5/2003 | Katz |
| 6,571,240 B1 | 5/2003 | Ho et al. |
| 6,574,599 B1 | 6/2003 | Lim et al. |
| 6,577,718 B1 | 6/2003 | Kalmanek et al. |
| 6,584,180 B2 | 6/2003 | Nemoto |
| 6,584,191 B1 | 6/2003 | McPartlan et al. |
| 6,587,556 B1 | 7/2003 | Judkins et al. |
| 6,587,558 B2 | 7/2003 | Lo |
| 6,598,021 B1 | 7/2003 | Shambaugh et al. |
| 6,598,136 B1 | 7/2003 | Norrod et al. |
| 6,600,736 B1 | 7/2003 | Ball et al. |
| 6,603,854 B1 | 8/2003 | Judkins et al. |
| 6,614,781 B1 | 9/2003 | Elliott et al. |
| 6,615,209 B1 | 9/2003 | Smith et al. |
| 6,615,248 B1 | 9/2003 | Smith |
| 6,631,186 B1 | 10/2003 | Gibson et al. |
| 6,662,163 B1 | 12/2003 | Albayrak |
| 6,678,360 B1 | 1/2004 | Katz |
| 6,678,718 B1 | 1/2004 | Khouri et al. |
| 6,690,788 B1 | 2/2004 | Bauer et al. |
| 6,694,012 B1 | 2/2004 | Posthuma |
| 6,697,458 B1 * | 2/2004 | Kunjibettu | 379/88.17 |
| 6,697,460 B2 | 2/2004 | Knott et al. |
| 6,700,972 B1 | 3/2004 | McHugh et al. |
| 6,704,404 B1 | 3/2004 | Burnett |
| 6,707,789 B1 | 3/2004 | Arslan et al. |
| 6,714,631 B1 | 3/2004 | Martin et al. |
| 6,714,643 B1 | 3/2004 | Gargeya et al. |
| 6,721,416 B1 | 4/2004 | Farrell |
| 6,731,722 B2 | 5/2004 | Coffey |
| 6,732,151 B1 | 5/2004 | Tobias et al. |
| 6,738,082 B1 | 5/2004 | Dong et al. |
| 6,738,473 B1 | 5/2004 | Burg et al. |
| 6,744,861 B1 | 6/2004 | Pershan et al. |
| 6,744,877 B1 | 6/2004 | Edwards |
| 6,751,306 B2 | 6/2004 | Himmel et al. |
| 6,751,591 B1 | 6/2004 | Gorin et al. |
| 6,757,306 B1 | 6/2004 | Klish, II et al. |
| 6,763,095 B1 | 7/2004 | Cermak et al. |
| 6,766,320 B1 | 7/2004 | Wang et al. |
| 6,775,359 B1 | 8/2004 | Ron et al. |
| 6,778,643 B1 | 8/2004 | Bushey et al. |
| 6,782,412 B2 | 8/2004 | Brophy et al. |
| 6,792,096 B2 | 9/2004 | Martin et al. |
| 6,798,876 B1 | 9/2004 | Bala |
| 6,807,274 B2 | 10/2004 | Joseph et al. |
| 6,823,307 B1 | 11/2004 | Steinbiss et al. |
| 6,831,932 B1 | 12/2004 | Boyle et al. |
| 6,832,224 B2 | 12/2004 | Gilmour |
| 6,842,504 B2 | 1/2005 | Mills et al. |
| 6,847,711 B2 | 1/2005 | Knott et al. |
| 6,847,715 B1 | 1/2005 | Swartz |
| 6,853,722 B2 | 2/2005 | Joseph et al. |
| 6,853,966 B2 | 2/2005 | Bushey et al. |
| 6,859,529 B2 | 2/2005 | Duncan et al. |
| 6,871,212 B2 | 3/2005 | Khouri et al. |
| 6,879,683 B1 | 4/2005 | Fain et al. |
| 6,885,734 B1 | 4/2005 | Eberle et al. |
| 6,891,932 B2 | 5/2005 | Bhargava et al. |
| 6,895,083 B1 * | 5/2005 | Bers et al. | 379/88.01 |
| 6,901,366 B1 | 5/2005 | Kuhn et al. |
| 6,907,119 B2 | 6/2005 | Case et al. |
| 6,915,246 B2 | 7/2005 | Gusler et al. |
| 6,922,689 B2 | 7/2005 | Shtivelman |
| 6,925,155 B2 | 8/2005 | Reynolds et al. |
| 6,944,592 B1 | 9/2005 | Pickering |
| 6,963,983 B2 | 11/2005 | Munson et al. |
| 6,964,023 B2 | 11/2005 | Maes et al. |
| 6,970,554 B1 | 11/2005 | Peterson et al. |
| 6,999,755 B2 | 2/2006 | Park |
| 7,003,079 B1 | 2/2006 | McCarthy et al. |
| 7,006,605 B1 | 2/2006 | Morganstein |
| 7,013,112 B2 | 3/2006 | Haller et al. |
| 7,027,975 B1 | 4/2006 | Pazandak et al. |
| 7,031,444 B2 | 4/2006 | Shen et al. |
| 7,035,388 B2 | 4/2006 | Kurosaki |

| | | |
|---|---|---|
| 7,039,166 B1 | 5/2006 | Peterson et al. |
| 7,062,505 B2 | 6/2006 | Lane et al. |
| 7,065,201 B2 | 6/2006 | Bushey et al. |
| 7,072,457 B2 | 7/2006 | Brown et al. |
| 7,092,370 B2 | 8/2006 | Jiang et al. |
| 7,095,827 B2 | 8/2006 | Guedalia |
| 7,095,842 B2 | 8/2006 | Brown et al. |
| 7,106,850 B2 | 9/2006 | Campbell et al. |
| 7,110,949 B2 * | 9/2006 | Bushey et al. ............ 704/251 |
| 7,124,059 B2 | 10/2006 | Wetzer et al. |
| 7,130,411 B2 | 10/2006 | Brown et al. |
| 7,133,504 B2 | 11/2006 | Fostick |
| 7,142,652 B2 | 11/2006 | Ho |
| 7,184,534 B2 | 2/2007 | Birch et al. |
| 7,200,614 B2 | 4/2007 | Reid et al. |
| 7,206,400 B2 | 4/2007 | Dezonno et al. |
| 7,242,751 B2 * | 7/2007 | Bushey et al. ............ 379/88.03 |
| 7,245,711 B2 | 7/2007 | Margolis |
| 7,245,716 B2 | 7/2007 | Lee et al. |
| 7,349,843 B1 | 3/2008 | Beck |
| 7,415,101 B2 * | 8/2008 | Bushey et al. ............ 379/88.04 |
| 7,450,698 B2 * | 11/2008 | Bushey et al. ............ 379/88.14 |
| 7,460,650 B2 * | 12/2008 | Bushey et al. ............ 379/88.03 |
| 7,620,159 B2 * | 11/2009 | Pasquale et al. .......... 379/88.04 |
| 7,623,632 B2 * | 11/2009 | Bushey et al. ............ 379/88.01 |
| 7,627,096 B2 * | 12/2009 | Bushey et al. ............ 379/88.03 |
| 7,657,020 B2 * | 2/2010 | Bushey et al. .......... 379/265.01 |
| 2001/0011211 A1 | 8/2001 | Bushey et al. |
| 2001/0018672 A1 | 8/2001 | Petters et al. |
| 2001/0019604 A1 * | 9/2001 | Joyce et al. ............. 379/114.2 |
| 2001/0021948 A1 | 9/2001 | Khouri et al. |
| 2001/0026608 A1 * | 10/2001 | Beyda et al. ............ 379/88.13 |
| 2001/0032075 A1 * | 10/2001 | Yamamoto ................ 704/256 |
| 2001/0032211 A1 | 10/2001 | Kuzumaki |
| 2001/0032229 A1 | 10/2001 | Hulls et al. |
| 2001/0034662 A1 | 10/2001 | Morris |
| 2002/0046030 A1 | 4/2002 | Haritsa |
| 2002/0049874 A1 | 4/2002 | Kimura |
| 2002/0055975 A1 * | 5/2002 | Petrovykh .................. 709/205 |
| 2002/0057678 A1 | 5/2002 | Jiang et al. |
| 2002/0059164 A1 | 5/2002 | Shtivelman |
| 2002/0059169 A1 | 5/2002 | Quarterman et al. |
| 2002/0064149 A1 * | 5/2002 | Elliott et al. ................ 370/352 |
| 2002/0067714 A1 | 6/2002 | Crain et al. |
| 2002/0067820 A1 | 6/2002 | Benson et al. |
| 2002/0087316 A1 * | 7/2002 | Lee et al. .................... 704/257 |
| 2002/0087385 A1 | 7/2002 | Vincent |
| 2002/0087558 A1 | 7/2002 | Bailey et al. |
| 2002/0114432 A1 | 8/2002 | Shaffer et al. |
| 2002/0122544 A1 | 9/2002 | Williams et al. |
| 2002/0133394 A1 | 9/2002 | Bushey et al. |
| 2002/0133413 A1 | 9/2002 | Chang et al. |
| 2002/0135618 A1 | 9/2002 | Maes |
| 2002/0156699 A1 | 10/2002 | Gray et al. |
| 2002/0165732 A1 | 11/2002 | Ezzeddine et al. |
| 2002/0169606 A1 * | 11/2002 | Bantz et al. ................. 704/235 |
| 2002/0188438 A1 | 12/2002 | Knight et al. |
| 2002/0196277 A1 | 12/2002 | Bushey et al. |
| 2003/0018659 A1 | 1/2003 | Fuks et al. |
| 2003/0026409 A1 | 2/2003 | Bushey et al. |
| 2003/0028498 A1 | 2/2003 | Hayes-Roth |
| 2003/0035381 A1 | 2/2003 | Chen et al. |
| 2003/0035516 A1 | 2/2003 | Guedalia |
| 2003/0069937 A1 | 4/2003 | Khouri et al. |
| 2003/0097428 A1 | 5/2003 | Afkhami et al. |
| 2003/0103619 A1 | 6/2003 | Brown et al. |
| 2003/0112956 A1 | 6/2003 | Brown et al. |
| 2003/0114105 A1 | 6/2003 | Haller et al. |
| 2003/0118159 A1 | 6/2003 | Shen et al. |
| 2003/0125945 A1 | 7/2003 | Doyle |
| 2003/0130841 A1 * | 7/2003 | Bangalore et al. ........... 704/231 |
| 2003/0130864 A1 | 7/2003 | Ho et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0156133 A1 | 8/2003 | Martin et al. |
| 2003/0165223 A1 | 9/2003 | Timmins et al. |
| 2003/0179876 A1 | 9/2003 | Fox et al. |
| 2003/0187732 A1 | 10/2003 | Seta |
| 2003/0187773 A1 | 10/2003 | Santos et al. |
| 2003/0194063 A1 | 10/2003 | Martin et al. |
| 2003/0195753 A1 | 10/2003 | Homuth |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0212558 A1 | 11/2003 | Matula |
| 2003/0228007 A1 | 12/2003 | Kurosaki |
| 2003/0235282 A1 | 12/2003 | Sichelman |
| 2003/0235287 A1 | 12/2003 | Margolis et al. |
| 2004/0005047 A1 | 1/2004 | Joseph et al. |
| 2004/0006473 A1 | 1/2004 | Mills et al. |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0066401 A1 | 4/2004 | Bushey et al. |
| 2004/0066416 A1 | 4/2004 | Knott et al. |
| 2004/0073569 A1 | 4/2004 | Knott et al. |
| 2004/0083479 A1 | 4/2004 | Bondarenko et al. |
| 2004/0088285 A1 | 5/2004 | Martin et al. |
| 2004/0101127 A1 | 5/2004 | Dezonno et al. |
| 2004/0103017 A1 | 5/2004 | Reed et al. |
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015197 A1 | 1/2005 | Ohtsuji et al. |
| 2005/0015744 A1 | 1/2005 | Bushey et al. |
| 2005/0018825 A1 | 1/2005 | Ho |
| 2005/0027535 A1 | 2/2005 | Martin et al. |
| 2005/0041647 A1 * | 2/2005 | Stinnie ....................... 370/352 |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0060200 A1 | 3/2005 | Kobylevsky et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0125232 A1 | 6/2005 | Gadd |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0147218 A1 | 7/2005 | Novack et al. |
| 2005/0169441 A1 | 8/2005 | Yacoub et al. |
| 2005/0169453 A1 | 8/2005 | Knott et al. |
| 2005/0171877 A1 | 8/2005 | Weiss |
| 2005/0172033 A1 | 8/2005 | Mathew et al. |
| 2005/0201547 A1 | 9/2005 | Burg et al. |
| 2005/0240411 A1 | 10/2005 | Yacoub |
| 2006/0018443 A1 | 1/2006 | Knott et al. |
| 2006/0023863 A1 | 2/2006 | Joseph et al. |
| 2006/0026049 A1 | 2/2006 | Joseph et al. |
| 2006/0036437 A1 | 2/2006 | Bushey et al. |

| | | | |
|---|---|---|---|
| 2006/0039547 | A1 | 2/2006 | Klein et al. |
| 2006/0056406 | A1 | 3/2006 | Bouchard et al. |
| 2006/0072737 | A1 | 4/2006 | Paden et al. |
| 2006/0109976 | A1 | 5/2006 | Sundaram et al. |
| 2006/0165066 | A1 | 7/2006 | Campbell et al. |
| 2006/0177040 | A1 | 8/2006 | Mitra |
| 2006/0190424 | A1 | 8/2006 | Beale et al. |
| 2006/0195312 | A1 | 8/2006 | Knight et al. |
| 2006/0256956 | A1 | 11/2006 | Lee et al. |
| 2006/0291642 | A1 | 12/2006 | Bushey et al. |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 10/975,023, filed Oct. 27, 2004.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.
Ogino, Tsukasa, et al., "Technologies for Internet Infrastructure: Eliminating the World Wide Wait," iNet Japan, Jul. 18-21, 2000, www.isoc.org/edproceedings/1g/index.
www.yahoo.com (as in Dec. 12, 1998) as archived in the Internet archive (www.archive.org).

* cited by examiner

| SYNONYM TABLE | | |
|---|---|---|
| DETECTED SPEECH | SYNONYM | |
| | PREFERRED | SPECIFIC |
| NEED HELP USING | HOW TO USE | NEED HELP USING |
| I'D LIKE TO GET | ACQUIRE | I'D LIKE TO GET |
| DISCONNECT | CANCEL | DISCONNECT |
| I'D LIKE TO KNOW | INQUIRE | I'D LIKE TO KNOW |
| HOW MUCH | INQUIRE | HOW MUCH |
| CALLER ID | NAMED SERVICE | CALLER ID |
| CALL NOTES | NAMED SERVICE | CALL NOTES |
| CALL FORWARD | NAMED SERVICE | CALL FORWARDING |

FIG. 4

| | ACTIONS | | | | | |
|---|---|---|---|---|---|---|
| OBJECTS | ACQUIRE | CANCEL | CHANGE | INQUIRE | INFORM | HOW TO USE |
| DSL | X001 | X002 | X003 | X004 | | X005 |
| BASIC SERVICE | X006 | X007 | | X008 | | X009 |
| NAMED SERVICE | X010 | X011 | X013 | X014 | | X012 |
| BILL | | | | X015 | X016 | |
| PAYMENT | | X015 | X016 | X032 | | X033 |
| OTHER PROVIDERS | | | | X034 | | |
| COUPONS SPECIALS | | | | X035 | | |
| NAME / NUMBER | | | | X036 | | |
| STORE LOCATIONS | | | | X038 | X039 | |

FIG. 5

SYSTEM AND METHOD FOR SPEECH-ENABLED CALL ROUTING

FIELD OF THE DISCLOSURE

The present disclosure relates generally to speech recognition systems and more particularly to speech recognition-enabled automatic call routing systems and methods.

BACKGROUND

Speech recognition systems are specialized computers that are configured to process and recognize human speech and may also take action or carry out further processes. Developments in speech recognition technologies support "natural language" type interactions between automated systems and users. A natural language interaction allows a person to speak naturally. Speech recognition systems can react responsively to a spoken request. An application of natural language processing is speech recognition with automatic call routing (ACR). A goal of an ACR application is to determine why a person is calling a service center and to route the caller to an appropriate agent or destination for servicing a request. Speech recognition technology generally allows an ACR application to recognize natural language statements so that the caller does not have to rely on a menu system. Natural language systems allow the caller to state the purpose of their call "in their own words."

Natural language ACR systems attempt to interpret the intent of the caller based on the spoken language and then selects a routing destination. When a speech recognition system misinterprets the caller's intent, significant problems can result. A caller who is misrouted is generally unhappy. Misrouted callers realize that there has been a mistake with the automated phone service and often terminate the call by hanging up. If a caller does not hang up they will typically be routed to an operator who will attempt to manually route the call. Routing a caller to an undesired location and to human operators leads to considerable inefficiencies for a business. Most call routing systems handle a large volume of calls and, even if a small percentage of calls are abandoned, the costs associated with abandoned calls are significant. Accordingly, there is a need for an improved automated method and system of routing calls.

BRIEF DESCRIPTION OF THE DRAWINGS

FIG. 4 is a table that depicts speech input and mapped synonym terms; and

FIG. 5 is a table illustrating action-object pairs and call destinations relating to the action-object pairs.

DETAILED DESCRIPTION OF THE DRAWINGS

A method of processing a call is disclosed. The method can transform speech input from a caller of a call into text and convert the text into an object and an action. The method determines a call destination based on the object and the action. The method can route the call to a destination when a caller is not in compliance with at least one business rule. The method can further route the call to the call destination when the caller is in compliance.

In a particular embodiment, the system includes a call routing system that has a processor configured to convert speech input from a caller into an object and an action. The system has an action-object routing module configured to determine a first destination for the call based on the object and the action. The call routing system can route the call to a second destination when the caller is not in compliance with a business rule.

In another embodiment the communication system includes an acoustic model configured to accept speech input and to produce text and a semantic model coupled to the acoustic model for producing an action and an object responsive to the text. The system further includes a routing module table responsive to the semantic model to provide a routing destination based on the action and the object.

Figure 1:
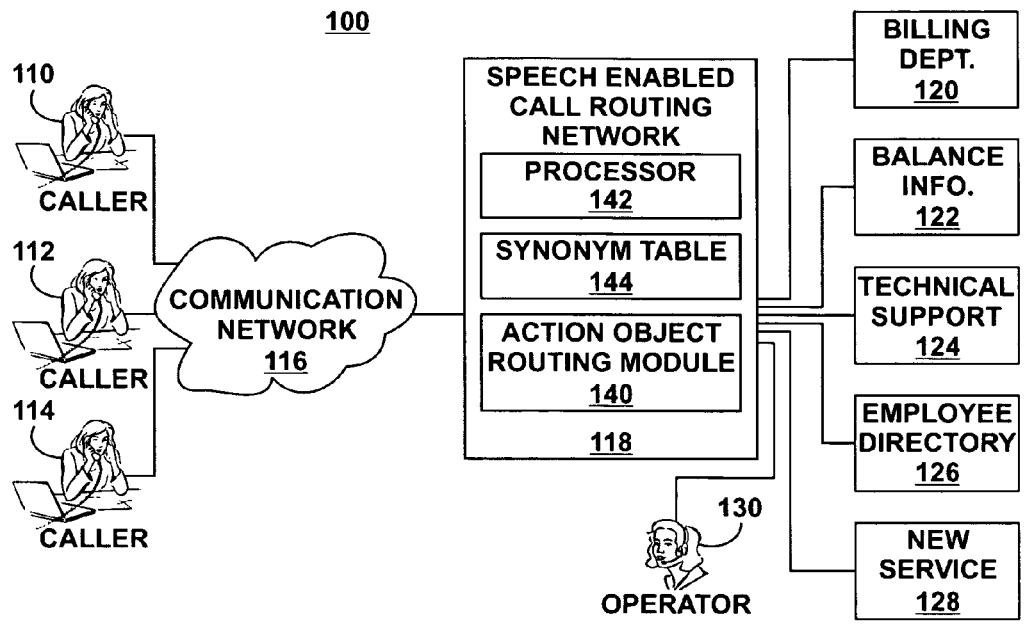
FIG. 1 illustrates a simplified configuration of a telecommunication system.

Referring now to FIG. 1, an illustrated communications system 100 that includes a call routing support system is shown. The communications system 100 includes a speech-enabled call routing system (SECRS) 118, such as an interactive voice response system having a speech recognition module. The communications system 100 includes a plurality of potential call destinations. Illustrative call destinations shown include service departments, such as billing department 120, balance information 122, technical support 124, employee directory 126, and new customer service departments 128. The system 100 includes a communication network 116 that receives calls from a variety of callers, such as the illustrated callers 110, 112, and 114. In a particular embodiment, the communication network 116 may be a public telephone network or may be provided by a voice over Internet protocol (VoIP) type network. The SECRS 118 may include components, such as a processor 142, a synonym table 144, and an action-object routing module 140. The SECRS 118 is coupled to and may route calls to any of the destinations, as shown. In addition, the SECRS 118 may route calls to an agent, such as the illustrated live operator 130. An illustrative embodiment of the SECRS 118 may be a call center having a plurality of agent terminals attached. Thus, while only a single operator 130 is shown, it should be understood that a plurality of different agent terminals or types of terminals may be coupled to the SECRS 118, such that a variety of agents may service incoming calls. In addition, the SECRS 118 may be an automated call routing system. In a particular embodiment, the action-object routing module 140 includes an action-object lookup table for matching action-object pairs to desired call routing destinations.

Figure 2:
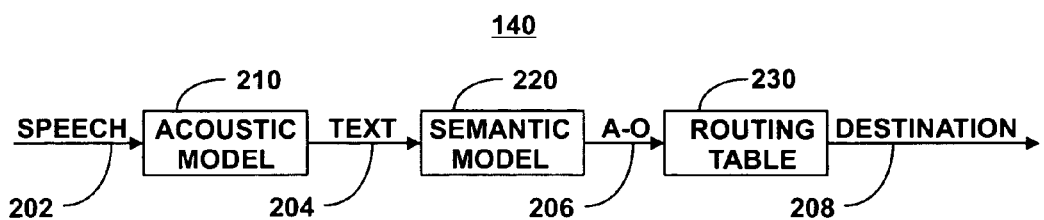
FIG. 2 is a general diagram that illustrates a method of routing calls.

Referring to FIG. 2, an illustrative block diagram of the SECRS 118 is depicted. In this particular embodiment, the processor 142 in the SECR 118 includes an acoustic model 210, a semantic model 220, and an action-object routing table 230. The acoustic model 210 receives speech input 202 and provides text as its output 204, and the semantic model 220 receives text 204 from the acoustic model 210 and produces an action-object pair. The actions and objects in the action-object table are ordered or ranked according to a confidence level. A confidence level indicates how likely a particular action or object reflects a correct and useable caller instruction. A call can be routed based on the overall highest confidence level action and object in an action-object list in the routing table 230. An exemplary routing table is depicted in FIG. 5. Objects are listed on the left side of the chart and actions are listed across the top of the chart. If the action of "acquire" has the highest confidence level for an action and "DSL" has the highest confidence level for an object, then the call would be routed to extension "001" according to the intersection in the table of the action-object pair "acquire-DSL." As a further example, when the action-object pair of "cancel-DSL" is selected, then the call would be routed to extension "002" according to the routing table. In the event that a confidence level for an action-object pair is below a predetermined level, the call may be routed to a human operator or agent terminal.

The routing table 230 can receive a selected action-object pair 206 from the semantic model 220 and produces a desired call routing destination 208. Based on the call routing destination 208, a call received at the SECRS 118 may be routed to a destination, such as billing department 120 or technical support service destination 124, as shown in FIG. 1. In a particular embodiment, the action-object routing table 230 may be a look-up table or a spreadsheet, such as Microsoft Excel™.

Figure 3:
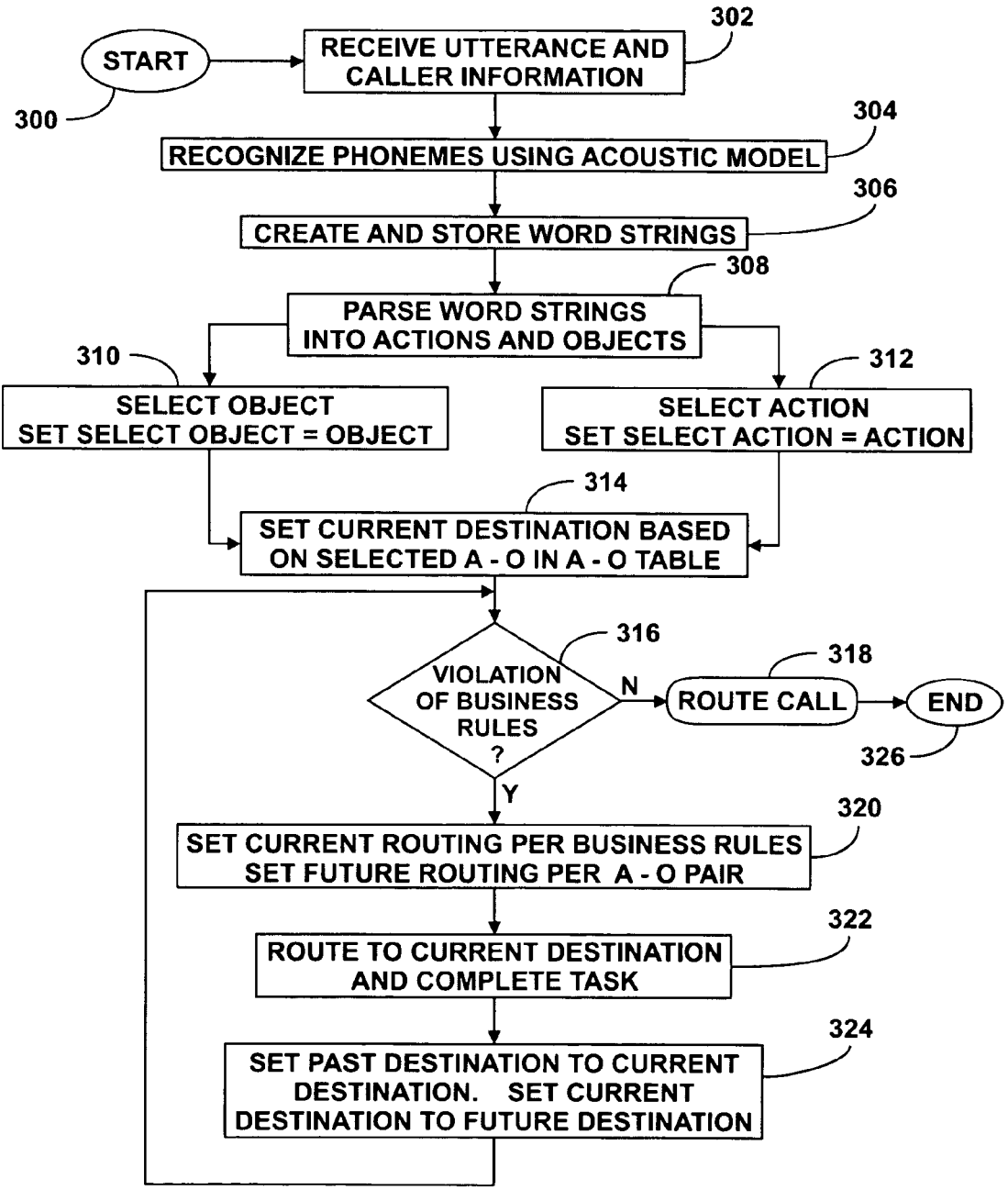
FIG. 3 is a flow diagram that illustrates a method of processing and routing calls.

Referring to FIG. 3, an illustrative embodiment of a method of processing a call using an automated call routing system, such as the system of FIG. 1, is illustrated. The method starts at 300 and proceeds to step 302 where a speech input signal, referred to as an utterance, is received or detected. Information about the caller is also received, such as information that can identify the caller or the caller's account number. This information can be automatically provided or it can be requested using a voice prompt and received as part of the utterance or as touchtone input. Using phonemes, the received speech input is converted into a plurality of word strings or text in accordance with an acoustic model, as shown at steps 304 and 306. In a particular embodiment, confidence levels are assigned to word strings based on established rules and the content and coherency of the word string. Next, at step 308, the word strings are parsed into actions and objects. Objects generally represent nouns and adjective-noun combinations while actions generally represent verbs and adverb-verb combinations. The actions and objects are assigned confidence values based on how likely they are to reflect the intent of the caller.

Many possible actions and objects may be detected or created from the word strings. To aid in the selection of a particular action and object, a table such as a synonym table can be utilized, as shown in FIG. 4. The synonym table can store natural language phrases and map the phrases to a predetermined list of actions and objects. Textual conversion of the natural language spoken by the caller in the acoustic model can be compared to natural language phrases in the table based on the phonetic-to-text conversion. Using the synonym table, the system and method maps portions of the natural phrases to at least one action or at least one object.

Additionally, the synonym table can provide rules for distinguishing recognized actions and recognized objects from specific actions and specific objects. Generally, there may be numerous actions that map to the same destination and numerous objects that map to the same destination. For example, in FIG. 4, the recognized object "Named Services" can include specific objects, such as "Caller ID," "Call Notes," "Call Forward" and other features or services that a single call service department may process. Thus, when a call request creates a recognized action or recognized object from a class of possible actions or objects, the call can be routed based on the recognized and selected action or the recognized and selected object. The specific action or specific object can be stored and transmitted with the call such that a destination system can utilize the action or object to assist the caller and meet the caller's objectives.

Recognized actions and objects can be assigned a confidence level based on textual similarities between predetermined or known actions and objects and results of the phonetic conversion. Additionally, rules that are based on consistency between a recognized action or an object and known phonemes can also be utilized to determine the confidence level. The method selects a most probable action and object from a list of recognized objects and actions utilizing the confidence levels, as is illustrated in steps 310 and 312. The selected action and selected object are paired and a current routing destination is determined at step 314. The method can track the treatment of the call utilizing three variables known as prior routing destination, current routing destination, and future routing destination. The prior routing destination variable refers to a previous location having processed the call, the current routing destination refers to a present location that is processing the call, and the future routing destination variable refers to where the call may be routed for processing. The variables can be set and reset throughout the process, as the call is routed, possibly among call centers. Thus, after an initial action object selection, the variables may be as follows: future routing destination equals null; prior routing destination equals null; current routing destination equals action-object table selection results.

Using the caller information received, the method determines if the caller is violating or has violated any business rules at decision step 316. For example, if a caller is late on their payment, or has a voice message box that has been full for over two months, the method may determine that the caller has violated a business rule. When a business rule has been violated, the call can be routed to a destination or a call service department determined by the business rules, as shown in step 320. When the call is transferred to a call service department that can overcome the rule violation, the variable can be reset as follows: (future routing destination equals table results; current routing destination equals business rules table; prior routing destination equals null). The call is routed to the current routing destination at step 322 and the caller is encouraged to take action to comply with the business rule that has been violated. After an attempt has been made to comply with the violation, the variables are reset (prior routing destination equals current routing destination; current routing destination equals future routing destination; future routing destination equals null), at step 324. The method proceeds back to decision step 316 to determine if the caller remains in violation of at least one business rule. If the caller is not in violation of a business rule, then the call is routed to the caller's desired destination, at step 318, the call routing destination variables are reset, and the method ends at step 326.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of processing a call comprising:
   receiving speech input from a caller;
   using phonemes to convert the received speech input into one or more word strings in accordance with an acoustic model;
   converting the one or more word strings into one or more actions and one or more objects in accordance with a semantic model;

assigning an action confidence level to each action of the one or more actions, wherein the action confidence level represents a probability that a particular action reflects an intended caller action;

assigning an object confidence level to each object of the one or more objects, wherein the object confidence level represents a probability that a particular object reflects an intended caller object;

determining an action-object pair that represents a highest confidence level action and a highest confidence level object;

determining a desired call destination based on the action-object pair using a routing table;

determining whether the caller is in compliance with a first business rule related to a maximum amount of time for a voice message box of the caller to be full;

routing the call to a second call destination when the caller is not in compliance with the first business rule, wherein the caller is prompted to comply with the first business rule at the second call destination; and upon compliance with the first business rule, routing the call to the desired call destination.

2. The method of claim 1, further comprising:
determining whether the caller is in compliance with a second business rule related to late payment;
routing the call to a third call destination when the caller is not in compliance with the second business rule; and
upon compliance with the second business rule, routing the call to the desired call destination.

3. The method of claim 2, wherein the call is not routed to the desired destination until the caller complies with the second business rule.

4. The method of claim 1, wherein the call is not routed to the desired destination until the caller complies with the first business rule.

5. The method of claim 1, wherein the maximum amount of time for the voice message box of the caller to be full is two months, and wherein the caller is not in compliance with the first business rule when the voice message box of the caller has been full for over two months.

6. The method of claim 1, wherein the call is a Voice over Internet Protocol (VoIP) call.

7. A speech-enabled call routing system comprising:
a processor;
a network interface to receive speech input from a caller;
an acoustic model executable by the processor to use phonemes to convert the received speech input into one or more word strings;
a semantic model executable by the processor to convert the one or more word strings into one or more actions and one or more objects;
an action object routing module executable by the processor to:
assign an action confidence level to each action of the one or more actions, wherein the action confidence level represents a probability that a particular action reflects an intended caller action; and
assign an object confidence level to each object of the one or more objects, wherein the object confidence level represents a probability that a particular object reflects an intended caller object;
determine an action-object pair that represents a highest confidence level action and a highest confidence level object;
determine a desired call destination based on the action-object pair using a routing table;
a business rule module executable by the processor to:
determine whether the caller is in compliance with a business rule related to a maximum amount of time for a voice message box of the caller to be full;
wherein the speech-enabled routing system routes the call to a second destination when the caller is not in compliance with the business rule, wherein the caller is prompted to comply with the business rule at the second call destination; and
wherein the speech-enabled routing system routes the call to the desired call destination upon compliance with the business rule.

8. The speech-enabled call routing system of claim 7, wherein the business rule module is further executable by the processor to determine whether the caller is in compliance with a second business rule related to late payment, wherein the speech-enabled routing system routes the call to a third call destination when the caller is not in compliance with the second business rule, and wherein the speech-enabled routing system routes the call to the desired call destination upon compliance with the second business rule.

9. The speech-enabled call routing system of claim 8, wherein the call is not routed to the desired destination until the caller complies with the second business rule.

10. The speech-enabled call routing system of claim 7, wherein the call is not routed to the desired destination until the caller complies with the first business rule.

11. The speech-enabled call routing system of claim 7, wherein the maximum amount of time for the voice message box of the caller to be full is two months, and wherein the caller is not in compliance with the first business rule when the voice message box of the caller has been full for over two months.

12. The speech-enabled call routing system of claim 7, wherein the call is a Voice over Internet Protocol (VoIP) call.

* * * * *